US011973757B2

(12) United States Patent
El-Moussa (10) Patent No.: US 11,973,757 B2
(45) Date of Patent: Apr. 30, 2024

(54) SECURE MATRIX BARCODE (71) Applicant: British Telecommunications Public Limited Company, London (GB)

(72) Inventor: Fadi El-Moussa, London (GB)

(73) Assignee: British Telecommunications Public Limited Company (GB)

(*) Notice: Subject to any disclaimer, the term of this patent is extended or adjusted under 35 U.S.C. 154(b) by 168 days.

(21) Appl. No.: 15/553,033

(22) PCT Filed: Feb. 23, 2016

(86) PCT No.: PCT/EP2016/053745
§ 371 (c)(1),
(2) Date: Aug. 23, 2017

(87) PCT Pub. No.: WO2016/135127
PCT Pub. Date: Sep. 1, 2016

(65) Prior Publication Data
US 2018/0248878 A1 Aug. 30, 2018

(30) Foreign Application Priority Data
Feb. 25, 2015 (EP) .................................... 15275050

(51) Int. Cl.
G06F 16/955 (2019.01)
G06F 21/53 (2013.01)
(Continued)

(52) U.S. Cl.
CPC .......... *H04L 63/10* (2013.01); *G06F 16/9554* (2019.01); *G06F 21/53* (2013.01);
(Continued)

(58) Field of Classification Search
CPC ... G06K 7/1417; G06F 21/566; G06F 21/629; G06F 21/53; G06F 16/9554;
(Continued)

(56) References Cited

U.S. PATENT DOCUMENTS 8,485,428 B1* 7/2013 Barker ................ G06F 21/6218
235/375
8,627,438 B1* 1/2014 Bhimanaik ............. H04L 63/08
726/9
(Continued)

FOREIGN PATENT DOCUMENTS

EP 2525297 A1 11/2012
GB 2507742 A 5/2014

OTHER PUBLICATIONS

International Search Report for corresponding International Application No. PCT/EP2016/053745 dated Mar. 24, 2016; 4 pages.
(Continued)

Primary Examiner — D'Arcy Winston Straub
(74) Attorney, Agent, or Firm — Pranger Law PC (57) ABSTRACT A security system in a network connected computing device, the device executing a software component that receives information stored in a matrix barcode, the information including a reference to a resource accessible via the network, the system including: a service bar that blocks the software component from accessing services of the computing device; and a logic unit that determines services of the computing device needed by the software component to access the resource, wherein the service bar is adapted to, responsive to a verification of permission of the software component to access the determined services, unblock the software component in order that the software component can access the resource and accesses the determined services.

13 Claims, 3 Drawing Sheets (51) Int. Cl.
*G06F 21/56* (2013.01)
*G06F 21/62* (2013.01)
*G06K 7/14* (2006.01)
*H04L 9/40* (2022.01)
*H04W 12/128* (2021.01)
*H04W 12/77* (2021.01)

(52) U.S. Cl.
CPC .......... *G06F 21/566* (2013.01); *G06F 21/629* (2013.01); *G06K 7/1417* (2013.01); *H04L 63/02* (2013.01); *H04L 63/14* (2013.01); *H04L 63/1483* (2013.01); *H04W 12/128* (2021.01); *G06F 2221/2149* (2013.01); *H04L 63/101* (2013.01); *H04W 12/77* (2021.01)

(58) Field of Classification Search
CPC . G06F 2221/2149; H04L 63/02; H04L 63/10; H04L 63/14; H04L 63/1483; H04L 63/101; H04W 12/77; H04W 12/128
See application file for complete search history.

(56) References Cited

U.S. PATENT DOCUMENTS

| | | | | |
|---|---|---|---|---|
| 9,183,383 | B1* | 11/2015 | Yablokov | G06F 12/16 |
| 9,262,633 | B1* | 2/2016 | Todeschini | G06K 7/10821 |
| 9,754,105 | B1* | 9/2017 | López-Chicheri | G06F 21/55 |
| 2002/0188649 | A1 | 12/2002 | Karim | |
| 2013/0179991 | A1* | 7/2013 | White | G06F 21/53 |
| | | | | 726/29 |
| 2015/0089497 | A1* | 3/2015 | Borzycki | G06F 9/45533 |
| | | | | 718/1 |
| 2015/0089642 | A1* | 3/2015 | Di Cocco | G06K 7/1417 |
| | | | | 726/22 |
| 2015/0170164 | A1* | 6/2015 | Marsico | G06Q 30/0201 |
| | | | | 235/375 |
| 2015/0199213 | A1* | 7/2015 | Desai | G06F 9/468 |
| | | | | 718/102 |
| 2016/0203352 | A1* | 7/2016 | Marsico | G06K 7/1417 |
| | | | | 235/375 |

OTHER PUBLICATIONS

Written Opinion of the International Searching Authority for corresponding International Application No. PCT/EP2016/053745 dated Mar. 24, 2016; 6 pages.

International Standard, "Information Technology—Automatic identification and data capture techniques—QR code 2005 bar code symbology specification," ISO/IEC 18004, Second Edition (Sep. 1, 2006); 124 pages.

Kieseberg et al., "QR Code Security," Proceedings of the 8th International Conference on Advances in Mobile Computing and Multimedia, Paris, France (Nov. 8-10, 2010); p. 430-435.

O'Donnell, A., "How to protect yourself from malicious QR codes," Lifewire; 4 pages. Accessed Sep. 3, 2014 https://www.lifewire.com/how-to-protect-yourself-from-malicious-qr-codes-2487772.

Symantec Corporation, "Features of Norton Snap," (Mar. 25, 2013); 2 pages. https://support.norton.com/sp/en/us/home/current/solutions/v64690996_EndUserProfile_en_us.

International Preliminary Report on Patentability for Application No. PCT/EP2016/053745, dated Sep. 8, 2017, 8 pages.

* cited by examiner

SECURE MATRIX BARCODE

CROSS-REFERENCE TO RELATED APPLICATIONS

The present application is a National Phase entry of PCT Application No. PCT/EP2016/053745, filed on 23 Feb. 2016, which claims priority to EP Patent Application No. 15275050.1, filed on 25 Feb. 2015, which are hereby fully incorporated herein by reference.

TECHNICAL FIELD

The present disclosure relates to matrix barcodes. In particular it relates to secure access to resources referenced by information stored in matrix barcodes.

BACKGROUND

Machine readable matrix barcodes storing information for scanning or reading by user devices can be used to exploit vulnerabilities in the devices for malicious purposes. Accordingly it would be beneficial to provide systems and methods to alleviate the aforementioned disadvantages.

SUMMARY

The present disclosure accordingly provides, in a first aspect, a security method for a network connected computing device executing a software component that receives information stored in a matrix barcode, the information comprising a reference to a resource accessible via the network, the method comprising: blocking the software component from accessing services of the computing device; determining services of the computing device needed by the software component to access the resource; and responsive to a verification of permission of the software component to access the determined services, unblocking the software component in order that the software component accesses the resource and accesses the determined services.

In some embodiments, determining the services includes executing the software component in a secure virtual machine as a virtualized software component such that the virtualized software component accesses the resource and wherein the virtualized software component accesses virtualized services corresponding to services of the computing device so as to determine the services of the computing devices needed by the software component to access the resource.

In some embodiments, the secure virtual machine is a transitory simulated user device having simulated services such that the secure virtual machine is discardable on completion of the determination or after a predetermined time period.

In some embodiments, the secure virtual machine is located at a service computer system communicably coupled to the computing device via the network.

In some embodiments, the software component is a first software component that executes a second software component to access the resource, and wherein determining the services includes identifying services of the computing device permitted for access by the second software component.

In some embodiments, blocking further comprises blocking the second software component from accessing services of the computing device.

In some embodiments, the verification includes requesting a user of the computing device to permit the software component to access the determined services.

In some embodiments, the computing device is a mobile device including matrix barcode scanning means and wherein the software component is an application executing on the mobile device.

In some embodiments, the services of the computing device include: data storage; microphone; camera; location services; libraries; functions; applications; network services; telephony services; call handling functions; and/or messaging functions.

In some embodiments, the blocking includes: interrupting execution of the software component; removing access by the software component to one or more services of the computing device; intercepting requests by the software component to one or more services of the computing device; and/or providing a firewall between the software component and one or more services of the computing device.

The present disclosure accordingly provides, in a second aspect, a network connected computing device comprising a processor and a data store, the processor being adapted to: execute a software component that receives information stored in a matrix barcode, the information comprising a reference to resource accessible via the network; block the software component from accessing services of the computing device; determine services of the computing device needed by the software component to access the resource; and in response to a verification of permission of the software component to access the determined services, unblock the software component in order that the software component accesses the resource and accesses the determined services.

The present disclosure accordingly provides, in a third aspect, a security system in a network connected computing device, the device executing a software component that receives information stored in a matrix barcode, the information comprising a reference to a resource accessible via the network, the system comprising: a service bar that blocks the software component from accessing services of the computing device; and a logic unit that determines services of the computing device needed by the software component to access the resource, wherein the service bar is adapted to, responsive to a verification of permission of the software component to access the determined services, unblock the software component in order that the software component can access the resource and accesses the determined services.

The present disclosure accordingly provides, in a fourth aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION

Machine readable codes such as barcodes can be used to store information for rapid, efficient and accurate data capture by computing devices using readers or scanners. The storage density of barcodes is improved using matrix barcodes as machine readable two dimensional representations. Examples of matrix barcodes include, inter alia: Data Matrix from Microscan Systems; NexCode from S5 Systems; PDF417 from Symbol Technologies; ShotCode; Quick Response (QR) codes from Denso Wave and documented in ISO/IEC 18004:2006 "Information technology—Automatic identification and data capture techniques—QR code 2005 bar code symbology specification" (ISO, 2006); Aztec Code; and others as will be known to those skilled in the art.

Matrix barcodes are scanned by devices such as computers, terminals, mobile devices including mobile computing devices, tablet computers, handheld computers, smartphones and the like. Scanning of matrix barcodes can be achieved using an optical scanner, camera or other suitable scanning or reading mechanism which may be interfaced with, communicative with or integral to a device in order to receive, at the device, the information stored by the matrix barcode. A device scanning a matrix barcode is typically preconfigured to respond to or act on the information received and in this way a practical application of the storage of information in the barcode is realized. For example, where a barcode provides data for storage by a scanning device the device will automatically perform a storage operation for information received by scanning the barcode. Further, where a barcode provides an input for a functional operation such as a reference, address, specification or similar, the device will perform the functional operation using the information as input.

A common application of matrix barcodes is for providing input strings to smartphones for accessing resources, such as a uniform resource locator (URL) for accessing a web-page or other resource. For example, many smartphones include or have available QR Code reading software for scanning a matrix barcode using an integral camera of the smartphone in order to access a URL stored in the barcode. Thus such matrix barcodes provide input for functional operations, such as web-browsing operations, in smartphone computing devices. Thus a smartphone can be used as a matrix barcode scanner, converting a barcode to a URL for an internet resource such as a website thereby obviating the need for a user to manually enter the URL into a web browser, for example.

One feature of matrix barcodes is that they are generally not readily interpreted by the human eye and require conversion by matrix barcode scanning or reading software, such as an application executing on a smartphone device. Thus a user will not be aware of a URL used as input by a smartphone application such as a web-browser. Further, in order to effect functionality prompted by data stored by a matrix barcode a device is typically configured to permit access to services of the user device required as part of the use of the data, such as by permitting use of networking facilities to access a URL. Thus a matrix barcode reader in a smartphone is typically configured to permit broad access to computing device services which can include, inter alia: network; processor; storage; microphone; camera; location services such as global positioning system (GPS) facilities or coarse location services such as cell-tower or wifi location services; the execution of, interfacing to or communication with applications, libraries or other software on the device; downloading resources, data, webpages, software, scripts and the like directly or indirectly referenced by way of a URL; telephony and/or call handling functions; messaging functions such as instant messaging, short-message service (SMS), multi-media messaging service (MMS) or other messaging functions; and other services as may be provided by or via a device.

Devices that read or act upon data stored in matrix barcodes are thus susceptible to exploitation, especially in view of the difficulty of a user to interpret a matrix barcode before scanning. The particular data content represented by a matrix barcode, or the nature of the resource (e.g. website) referenced by the content (e.g. URL), can be exploitative or can be tampered with such as by being replaced, adapted or overwritten, or by tampering with or intercepting requests to a resource (e.g. website) referenced by the data (e.g. URL) stored in a previously reliable or trusted matrix barcode. For example, matrix barcodes can be overlaid with rogue barcodes, or rogue barcodes can be presented to a user in the context of reputable associated material such as posters, products, articles and the like, as a type of phishing exercise. In an alternative example, a resource such as a website that is referenced by a genuine matrix barcode can become compromised through attack or by exploitation of a vulnerability and replaced with a rogue website. Where a device reads and acts upon such rogue barcodes or accesses such rogue resources the broad service permissions of the scanning device represents a considerable security vulnerability. Thus rogue barcodes or resources may be able to exploit local device services such as previously listed.

An example use-case in an exploitative scenario can be: a user scans a QR Code using a smartphone. The scanned barcode results in the phone navigating to a website which retrieves information about user's device and the user. The website further redirects the user's browser to rogue a website specifically designed to exploit the user's browser to enable microphone, camera and GPS services on the user's device. The rogue website streams video, audio and location information from the smartphone to a remote server. Other outcomes can include the interception of, or access to, sensitive data (passwords, files, contacts, transactions) and sending emails and/or messages. Further, malware may be propagated by the user's device or distributed denial of service (DDOS) packets as part of a botnet. Privacy settings could be modified leading to compromise of the user's private identity information. Such actions could occur in the background while the user is only seeing the QR Code reader opening a seemingly harmless web page. For example, attacks using QR Codes have led to smartphones being compromised to act as premium-rate SMS senders taking orders from a centralized "command-and-control" server. The premium-rate SMS numbers are used to loot a user of money by way of payments for unwittingly sending messages to the premium-rate SMS number. Other conceivable attacks triggered by malicious QR Code usage can include changing a device configuration to spread a botnet, for SQL injection, command injections and the like, and additionally to lead users to more traditional web-based attacks such as fake websites, phishing, pharming, fraud or social engineer attacks.

Figure 1:
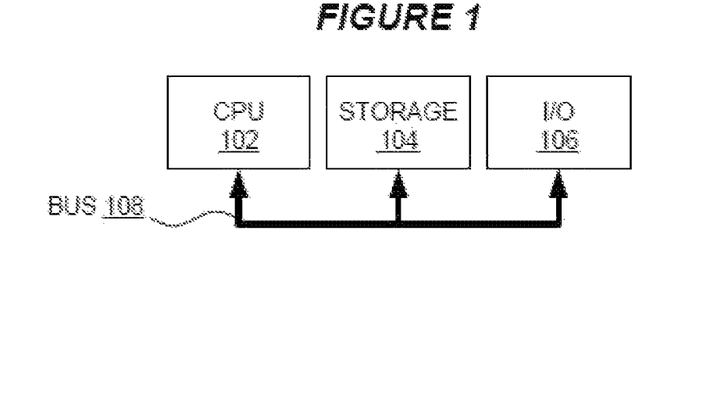
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/ output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
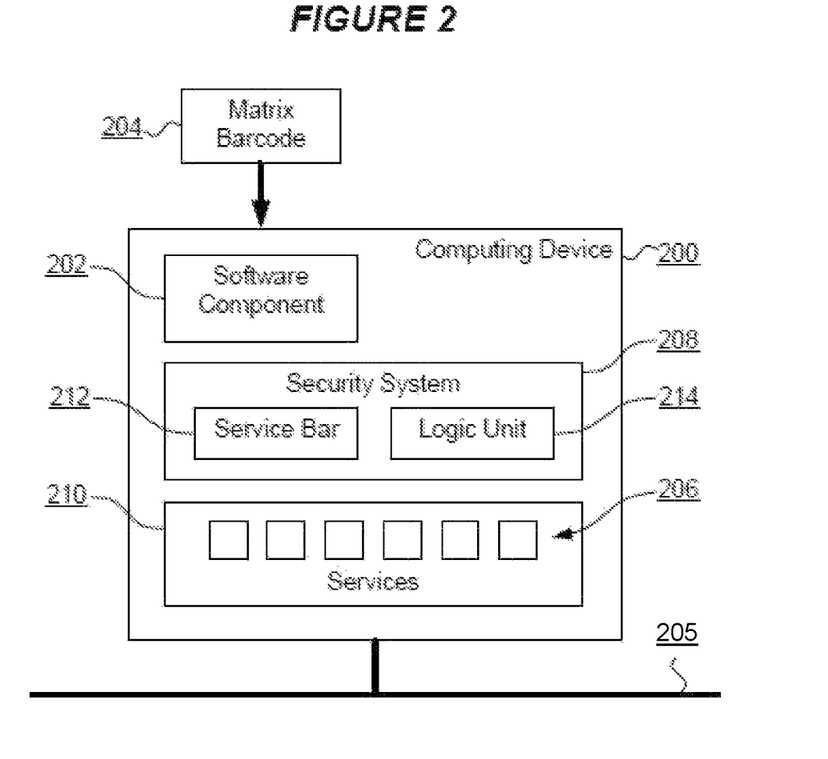
FIG. 2 is a component diagram of a network connected computing device including a security system in accordance with embodiments of the present disclosure.

FIG. 2 is a component diagram of a network 205 connected computing device 200 including a security system 208 in accordance with embodiments of the present disclosure. The computing device 200 can be a static or mobile device such as a computer system, computer server, cellular telephone, smartphone, tablet computer, a pervasive device and the like, and is connected to a wired, wireless or combination network 205 such as a wireless connection to the internet, a cellular telephone connection such as a 3G, 4G or similar connection, an Ethernet connection and/or other networks and connections as will be apparent to those skilled in the art. For example the reference is a URL to a resource accessible via the internet such as a webpage. The software component 202 is executable by the computing device 200 such as by storage in a memory of the computing device 200 and executing by a processor of the computing device 200. For example the software component 202 can be an application (app) executing on a smartphone computing device. In one embodiment the software component 202 includes a matrix barcode reader arranged to use a scanning service of the computing device 200 such as a camera in order to scan the matrix barcode 204 and extract the information therefrom. For example, the software component 202 is a QR Reader app executing in a smartphone computing device. Alternatively the software component 202 is a component or app that receives information from a hardware, software or firmware component such as an executing computer program, service or facility of the computing device 200. For example, the software component 202 is an app executing in a smartphone computing device receiving the information from an operating system of the smartphone that includes a QR Reader function.

The computing device 200 further includes a set 210 of services 206. While the services 206 are logically represented together in a set 210 this is merely a logical representation and the services can be disparate in nature, characteristics, function, facilities, configuration and arrangement. Thus a camera service can be constituted as a physical hardware apparatus as a camera including a lens and associated components in conjunction with software, firmware and/or storage components required for capturing, (optionally encoding) and storing an image in a data store of the computing device 200. In contrast a coarse location service can be constituted as an entirely software component adapted to obtain coarse location information from network facilities such as wireless network information in proximity to the computing device 200. Such services are disparate and unrelated yet are illustrated in FIG. 2 as logically grouped in a set 210 of services for simplicity. Services include any and/or all such services of a computing device as hereinbefore described.

The computing device 200 further includes a security system 208 as a software, hardware, firmware or combination component. The security system 208 includes a service bar 212 that blocks the software component 202 from accessing at least a subset of the set 210 of services 206 of the computing device 200. The subset can be predefined to include security sensitive services such as, inter alia: services storing, accessing, containing or disclosing private or sensitive information; services providing, or contributing to, location information; services relating to the storage of data at or for the computing device 200; services relating to telephony or networking features, functions or facilities of the computing device 200; certain software functions, libraries or applications; and/or any other services that might be considered sensitive, private, privileged or may desirably be prevented from exploitation, unauthorized access or unauthorized use. In one embodiment the service bar 212 blocks the software component 202 from accessing all services 206 or all services 206 save for a specifically defined subset of the set 210 of services 206 that is required for most basic mode of operation such as access only to a constrained area of a storage of the computing device 200 necessary to maintain the presence of the software component 202 at the computing device 200. The security bar 212 can achieve the blocking function in any suitable manner. In one embodiment the security bar 212 blocks the software component 202 by interrupting execution of the software component such as by suspending the software component or a software thread of execution or process in or with which the software component 202 executes or by stopping, ceasing, suspending or pausing one or more processors of the computing device 200 with or on which the software component 202 executes. In an alternative embodiment the security bar 212 blocks the software component 202 by removing access, by the software component 202, to one or more services of the computing device such as by inhibiting or removing access to an interface such as an application programming interface, a library and/or function look-up table, a static or dynamic library mapping table, matrix, hashmap or the like, such that the software component 202 is unable to access, invoke, communicate with or receive information, data or input/output from services. In an alternative embodiment the security bar 212 blocks the software component 202 by intercepting requests by the software component 202 to one or more services 206 of the computing device 200 and/or providing a firewall between the software component 202 and one or more services 206 of the computing device 200.

The security system 208 further includes a logic unit 214 as a software, hardware, firmware or combination component adapted to determine a subset of the set 210 of services 206 of the computing device 202 needed by the software component 202 in order to access a resource referenced by the information stored in the matrix barcode 204. In one embodiment the logic unit 204 executes or causes the execution of the software component 202, or a copy, version, duplicate or mirror of the software component 202, in a secure virtual machine as a virtualized software component as is described below with reference to FIG. 3. Alternatively the logic unit 204 identifies a set of services 206 that the software component is authorized to access (save for the fact that the software component is blocked from accessing by the service bar 212), and in some embodiments, identifies a subset of such set of authorized services that are needed by the software component 202 to access the resource. In one embodiment the software component 202 is a first software component that invokes, refers to, interfaces with, delegates to, prompts and/or triggers a second software component (not illustrated) to undertake to access the resource referenced by the information stored in the matrix barcode 204. Thus where such second software component has associated authorized services 206 taken from the set 210 of services 206 which the second software component is authorized to use and/or access the logic unit 214 can determine such authorized services 206 are services needed to access the resource. Notably, in such an embodiment having such a second software component the service bar 212 is preferably further adapted to block the second software component from accessing services of the computing device 200.

The security system 208, whether by way of the logic unit 214 and/or the service bar 212 operating alone or in combination, is further adapted to verify whether the software component 202 has permission to access the determined services needed to access the resource referenced by the information in from the matrix barcode 204. Such verification can be undertaken by reference to a secure authorization service in or communicable with the computing device 200 such as a secure repository of authorized services for software components, an access control list, a set of conditions for authorization of services the satisfaction of which can be tested by the security system 208 based on parameters such as current operational parameters or attributes of the software component 202, the information of the matrix barcode 204 and/or the resource itself. In one embodiment the verification includes requesting a user of the computing device 200 to permit the software component 202 to access the determined services, such as by prompting the user via a display and/or user interface of the computing device 200. Where permission of the software component 202 to access the required services is verified, the service bar 212 unblocks the software component 202 in order that the software component 202 can access the resource referenced by the information of the matrix barcode 204, and such that the software component 202 can access the determined subset of the set 210 of services 206 needed to access the resource.

Thus, in use, the computing device 200 scans, or has scanned, a matrix barcode 204, information from which comprise a reference to a resource accessible via the network 205 and is received by the software component 202. The service bar 212 promptly blocks the software component 202 from accessing at least a subset of the set 210 of services 206 of the computing device. Such prompt blocking by the service bar 212 serves to prevent malicious resources accessed by the software component 202 based on the reference in the information of the matrix barcode 204 while the logic unit 214 determines a subset of the set 210 of services 206 of the computing device 200 needed by the software component 202 to access the resource. Responsive to a verification by the security system 208 of permission of the software component 202 to access the determined services, the software component 202 is unblocked from accessing the services in order that the resource and determined services can be accessed.

In an exemplary embodiment the user device 200 is a smartphone such as a smartphone operating with the Android operating environment or system, and the software component 202 is a QR reader Android application that operates with a camera of the smartphone to scan a QR Code, decode the scanned code to extract information contained therein including a URL to a webpage, and a browser for navigating to the URL. The QR reader application has associated an XML manifest file "AndroidManifest.xml" that defines, inter alia, permissions specifying the services of the smartphone required for execution of the QR reader application. For example, the exemplary XML snippet below specifies that the "CAMERA" service is required for operation of the QR reader application:

```
<manifest xmlns:android="http://schemas.android.com/apk/res/android"
    package="com.android.app.QRreader" >
```

```
<uses-permission android:name="android.permission.CAMERA" />
...
</manifest>
```

Other Android permissions include, inter alia:
ACCESS_FINE_LOCATION: allow Application to access GPS, cell towers, and Wi-Fi.
ACCESS_COARSE_LOCATION: Allows an app to access approximate location derived from network location sources such as cell towers and Wi-Fi.
ACCESS_NETWORK_STATE: allow an application to access information about networks
ACCESS_WIFI_STATE: Allow an application to access to access information about Wi-Fi networks.
CAMERA: Allow an application to access the camera device.
INTERNET: Allow an application to access to open network sockets.
CALL_PHONE: Allow an application to initiate a phone call without going through the Dialler user interface for the user to confirm the call being placed.
SEND_SMS: Allow an application to send SMS messages.
WRITE_EXTERNAL_STORAGE: Allow an application to write to external storage.

In use the QR reader application scans and reads the matrix barcode 204 as a QR Code to extract a URL. In accordance with embodiments of the present invention the service bar 212 promptly blocks the QR reader from accessing services 206. For example, at least the services listed in the permissions specifiers ("<uses-permissions . . . />") in the associated XML manifest file can be blocked. In this way the QR reader is prevented from accessing services while attempting to access the resource at the URL. Notably the QR reader may be operable to retrieve the resource at the URL, such as a webpage or the like, but any particular smartphone service required or used by the resource will not succeed since such services are blocked. E.g. if a webpage attempts to access a camera of the smartphone the attempt will fail due to the block. The logic unit 214 determines services of the smartphone required by the QR reader application to access the resource. One way such determination can be made is by logging, observing, tracing or recording service requests from the QR reader application while it is blocked by the service bar 212—such service requests failing due to the block. Subsequently, the security system 208 that, in one embodiment, is embodied within the Android operating environment of the smartphone and executes in a privileged mode or operation, verifies the permission of the QR reader to access the determined services. In one embodiment the security system 208 employs existing privacy and security services of the Android operating environment by generating and/or adapting a manifest XML associated with the QR reader application to include permission entries for each of the determined services. Thus, a new "<uses-permission . . . />" entry can be provided in the manifest XML file for each service determined to be required for access to the resource. Such a manifest file will automatically prompt a user on a display of the smartphone for the user to verify that the QR reader application has the user's permission to access the determined services. The list of services may be accompanied by a human-readable representation of the information of the matrix barcode 204 such as all or part of the URL extracted from the QR code. Subsequently, if the permissions are verified, the service bar 212 unblocks the QR reader so that the QR reader can access the determined services to access the resource at the URL.

Figure 3:
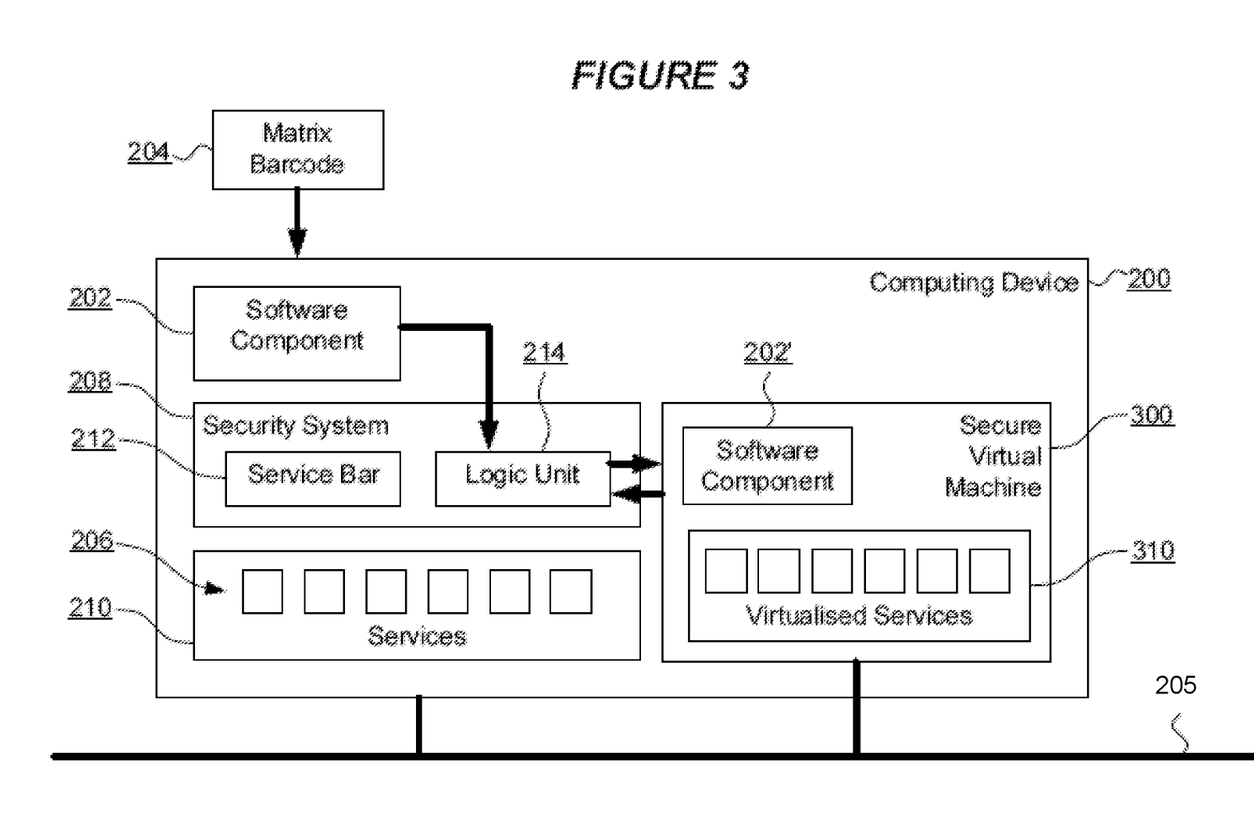
FIG. 3 is a component diagram of a network connected computing device including a security system in accordance with embodiments of the present disclosure.

FIG. 3 is a component diagram of a network connected computing device including a security system in accordance with embodiments of the present disclosure. Many of the features of FIG. 3 are identical to those described above with respect to FIG. 2 and these will not be repeated here. FIG. 3 illustrates an exemplary embodiment of the present disclosure in which the logic unit 214 employs a secure virtual machine 300 for undertaking the determination of services of the computing device 200 needed by the software component 202 to access the resource referenced by the information of the matrix barcode 204. The secure virtual machine 300 is a virtualized computing environment in which operable virtual representations of machines such as the computing device 200 can be executed. The secure virtual machine 300 is not a physical machine but includes one or more virtualized hardware components such as virtualized processor(s), virtualized memory/store, virtualized input/output facilities. The secure virtual machine 300 is transient in that it can be generated and/or instantiated as required and deleted, discarded and/or disposed of when no longer required. Alternatively the secure virtual machine 300 can be persistent by serialization, storage or recording of the virtual machine 300 such as a state of the virtual machine 300 including all virtualized components of the virtual machine 300. The secure virtual machine 300 is secure in the sense that the software and components within the virtual machine 300 cannot access the computing device 200 except via a virtualized computing facility such as a virtual machine manager or hypervisor. Thus operations taking place within the secure virtual machine 300 do not effect the security and stability of the computing device 200 outside the virtual machine 300.

The secure virtual machine 300 includes virtualized services 310 as virtual representations of services of the computing device 200. Such services can be simulated, emulated or representative, mock or dummy services, such as software components adapted to respond to requests via a software or emulated hardware/firmware interface in an expected manner without necessarily involving actual service instantiation. For example, a virtualized camera service can be a software component adapted to behave like a real camera of the computing device 200 without actually providing data from such a real camera (so ensuring the security of the virtual machine 300 and the computing device 200). Networking services can be virtualized, though in a preferred embodiment networking services are additionally provided with connectivity to a real network 205 via the computing device 200 in a controlled manner such that software components executing within the virtual machine 300 are able to communicate with other entities via the network in order that the determinations of the logic unit 214 might be made.

Thus in the embodiment of FIG. 3 the logic unit 214 of the security system 208 copies, duplicates, moves or otherwise represents the software component 202 within the virtual machine 300 as virtualized software component 202'. The virtualized software component 202' executes to receive information stored in the matrix barcode 204 (such as provided to the virtualized software component 202' by the logic unit 214) and is unconstrained (i.e. not blocked by the service bar 212) in its operation to access the resource referenced by the information of the matrix barcode 204. Thus, the software component 202' access services of the secure virtual machine 300 to access the resource, except that the services are virtualized services save for any network services absolutely necessary to communicate with remote systems and servers in procuring, accessing and interacting with the resource. Thus in this way the logic unit 214 by analysis of the operation of the virtualized software component 202' and, in particular, the virtualized services utilized by the virtualized software component 202', is able to determine the services in the set 210 of services 206 of the computing device 200 needed to access the resource.

While the secure virtual machine 300 of FIG. 3 is illustrated as comprised within the computing device 200 it will be appreciated by those skilled in the art that the virtual machine 300 can alternatively be provided remote and/or external to the computing device 200, such as a virtualized environment provided by a computing system server communicatively connected to the computing device 200 via network 205. Such an arrangement can be particularly beneficial where the computing device 200 has constrained resources such as may be the case with mobile devices and the like.

Figure 4:
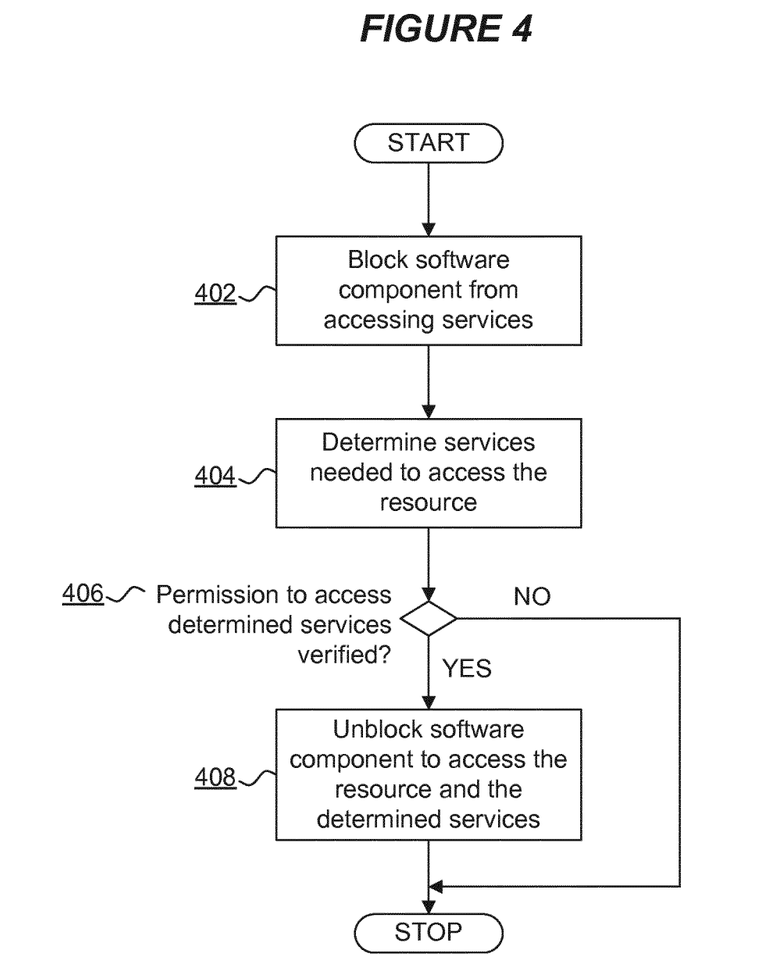
FIG. 4 is a flowchart of a security method for a network connected computing device in accordance with embodiments of the present disclosure.

FIG. 4 is a flowchart of a security method for a network connected computing device 200 in accordance with embodiments of the present disclosure. Initially, at 402, the method blocks the software component 202 from accessing services of the computing device 200. Subsequently at 404 the method determines services of the computing device needed by the software component to access a resource referenced by information stored in a matrix barcode 204. At 406 the method determines if the software component has verified permission to access the determined services and, if so, the method unblocks the software component 202 at 408 in order that the software component accesses the resource and the services needed for access to the resource.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A security method for a network-connected computing device, the computing device configured to provide services, the method comprising:
reading information stored in a matrix barcode with a first software component of a plurality of software components executing on the computing device, the information comprising a reference to a resource accessible via the network; and
by a security system operating on the computing device:
blocking the first software component from accessing at least a subset of the services provided by the computing device and allowing the first software component to access at least one of the services provided by the computing device;
determining, based on the information read from the matrix barcode, the services provided by the computing device that are needed by the first software component to access the resource; and
responsive to a verification of permission of the first software component to access the determined services provided by the computing device, unblocking the first software component in order that the first software component accesses the resource and accesses the determined services provided by the computing device.

2. The method of claim 1 wherein determining the services provided by the computing device includes executing a second software component of the plurality of software components in a secure virtual machine as a virtualized software component such that the virtualized software component accesses the resource, and wherein the virtualized software component accesses virtualized services corresponding to the services of the computing device so as to determine the services provided by the computing device needed by the second software component to access the resource.

3. The method of claim 2 wherein the secure virtual machine is a transitory simulated user device having simulated services such that the secure virtual machine is discardable on completion of the determination or after a predetermined time period.

4. The method of claim 2 wherein the secure virtual machine is located at a computer system server communicably coupled to the computing device via the network.

5. The method of claim 1 wherein the first software component executes another software component of the plurality of software components to access the resource, and wherein determining the services provided by the computing device includes identifying the services provided by the computing device permitted for access by the another software component.

6. The method of claim 5 wherein the blocking further comprises blocking the another software component from accessing the services provided by the computing device.

7. The method of claim 1 wherein the verification includes requesting a user of the computing device to permit the first software component to access the determined services provided by the computing device.

8. The method of claim 1 wherein the computing device is a mobile device including matrix barcode scanning means, and wherein the first software component is an application executing on the mobile device.

9. The method of claim 1 wherein the services provided by the computing device include at least one of: data storage; microphone; camera; location services; libraries; functions; applications; network services; telephony services; call handling functions; or
messaging functions.

10. The method of claim 1 wherein the blocking includes at least one of:
interrupting execution of the first software component;
removing access by the first software component to one or more of the services provided by the computing device;
intercepting requests by the first software component to one or more of the services provided by the computing device; or
providing a firewall between the first software component and one or more of the services provided by the computing device.

11. A network connected computing device comprising a processor and a data store, the processor being adapted to:
execute a first software component of a plurality of software components to read information stored in a matrix barcode, the information comprising a reference to a resource accessible via the network;
block the first software component from accessing at least a subset of services provided by the computing device and allow the first software component to access at least one of the services provided by the computing device;
determine the services provided by the computing device that are needed by the first software component to access the resource; and
in response to a verification of permission of the first software component to access the determined services provided by the computing device, unblock the first software component permitting the first software component to access the resource and the determined services provided by the computing device.

12. A security system in a network-connected computing device providing services, the system comprising:
a microprocessor and memory configured to:
read information stored in a matrix barcode with a first software component of a plurality of software components executing on a computing device, the information comprising a reference to a resource accessible via the network,
block the first software component from accessing at least a subset of the services of the computing device and allow the first software component to access at least one of the services provided by the computing device,
determine the services provided by the computing device needed by the first software component to access the resource based on the information read from the matrix barcode, and
responsive to a verification of permission of the first software component to access the determined services provided by the computing device, unblock the first software component permitting the first software component to access the resource and access the determined services provided by the computing device.

13. A non-transitory computer program element comprising computer program code to, when loaded into a computer system and executed thereon, cause the computer to implement a security method for a network-connected computing device configured to provide services, by:

reading information stored in a matrix barcode with a first software component of a plurality of software components executing on the computing device, the information comprising a reference to a resource accessible via the network;

blocking the first software component from accessing at least a subset of the services provided by the computing device and allowing the first software component to access at least one of the services provided by the computing device;

determining the services provided by the computing device needed by the first software component to access the resource based on the information read from the matrix barcode; and responsive to a verification of permission of the first software component to access the determined services, unblocking the first software component in order that the first software component accesses the resource and accesses the determined services provided by the computing device.

* * * * *

UNITED STATES PATENT AND TRADEMARK OFFICE
CERTIFICATE OF CORRECTION

PATENT NO. : 11,973,757 B2
APPLICATION NO. : 15/553033
DATED : April 30, 2024
INVENTOR(S) : El-Moussa Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this
Third Day of December, 2024

Katherine Kelly Vidal
*Director of the United States Patent and Trademark Office*